(12) United States Patent
Husband et al.

(10) Patent No.: US 8,294,463 B2
(45) Date of Patent: Oct. 23, 2012

(54) MULTI-PURPOSE VALVE FOR CRYOGEN GAS EGRESS

(75) Inventors: Trevor Bryan Husband, Kidlington (GB); Philip Alan Charles Walton, Oxon (GB)

(73) Assignee: Siemens PLC, Frimley, Camberley (GB)

( * ) Notice: Subject to any disclaimer, the term of this patent is extended or adjusted under 35 U.S.C. 154(b) by 549 days.

(21) Appl. No.: 12/551,831

(22) Filed: Sep. 1, 2009

(65) Prior Publication Data
US 2010/0102818 A1    Apr. 29, 2010

(30) Foreign Application Priority Data
Sep. 1, 2008 (GB) .................................... 0815864.4

(51) Int. Cl.
*G01V 3/00* (2006.01)
(52) U.S. Cl. ........................ 324/318; 324/322
(58) Field of Classification Search .................. 324/318, 324/322, 307, 309
See application file for complete search history.

(56) References Cited

U.S. PATENT DOCUMENTS

| 2,262,396 | A | * | 11/1941 | Harrison | 417/297 |
| 4,280,681 | A | | 7/1981 | Harris | |
| 6,722,631 | B2 | | 4/2004 | Bailey | |
| 8,104,296 | B2 | * | 1/2012 | Harper et al. | 62/45.1 |

FOREIGN PATENT DOCUMENTS

| GB | 1 310 493 | 3/1973 |
| GB | 2 365 948 | 2/2002 |
| GB | 2 386 669 | 9/2003 |

* cited by examiner

*Primary Examiner* — Louis Arana
(74) *Attorney, Agent, or Firm* — Schiff Hardin LLP

(57) ABSTRACT

A valve for controlling cryogen egress from a cryogen vessel has a housing having a low pressure side and a high pressure side with a fluid path defined between. A valve element is interposed between the low pressure side and the high pressure side of the housing. A mechanism is provided for holding the valve element against a valve seat. The mechanism has a cam shaft that is rotatable to displace the valve element from its seat to open the fluid path.

15 Claims, 5 Drawing Sheets

MULTI-PURPOSE VALVE FOR CRYOGEN GAS EGRESS

BACKGROUND OF THE INVENTION

1. Field of the Invention

The present invention relates to a multi-purpose valve for facilitating cryogen egress from a cryogen vessel. It is particularly applicable to cryogen-containing cryogen vessels used to cool superconducting magnets, such as those employed in nuclear magnetic resonance (NMR) or magnetic resonance imaging (MRI) systems.

2. Description of the Prior Art

As is well known to those skilled in the art, cryogen-cooled superconducting magnets are susceptible to quench events. During a quench event, one part of the superconducting wire forming the magnet becomes resistive for some reason. Reasons include rising temperature due to mechanical stress, movement of the wire within the magnetic field of the magnet casing resistive heating of the cladding, imperfect materials leading to resistive heating. The resistive part of the wire heats up and makes adjacent parts of the superconducting wire resistive also. The quench spreads until a larger proportion of the superconductive magnet is resistive. The large currents typically carried by a superconducting magnet continue to flow through the resistive wire, and cryogen is lost by boil-off due to the heat generated within the cryogen vessel. The pressure within the cryogen vessel increases until a safety valve, known as a quench valve and provided for this purpose, opens. Cryogen gas, and usually also some liquid, escapes through the quench valve until the pressure within the cryogen vessel falls to an acceptable level. The quench valve may then be closed. Arrangements may be provided to self-close the quench valve mechanically, for example using gravity or spring-loaded mechanisms; or a control system may operate an electrically-driven valve actuator. Alternatively, the quench valve may latch in an open state until a service technician closes it.

SUMMARY OF THE INVENTION

The present invention relates, in part, to an improved quench valve.

The above description explains the safety function of a valve designed to release pressure within the cryogen vessel, but it is also necessary for a service technician to be able to release pressure within the cryogen vessel at times chosen by the technician, to enable certain service operations. Conventionally, a so-called bypass valve is provided. This bypass valve provides a second gas path from the cryogen vessel to atmosphere, or to a cryogen recovery system. It is typically connected in parallel with the quench valve: so as to provide a "bypass" path around the quench valve. The bypass valve is typically manually activated, so that a service technician is able to open the bypass valve, typically by turning a handle or lever, and wait for the pressure in the cryogen vessel to drop to atmospheric pressure, or any other pressure appropriate for the service operation to be carried out.

The present invention relates, in part, to an improved bypass valve.

Disadvantages with the known arrangement of a quench valve and parallel bypass valve include the following. A large number of components are required to provide separate quench and bypass valves. The two valves in parallel provide two possible leakage paths, through the respective valve seats. Positioning of the bypass valve is demanding: space must be found on the apparatus, despite a large number of pieces of equipment also being present, and the general desire to make such equipment as small as possible. The bypass valve should be close to the quench valve, and its actuator, such as a handle or lever, must be accessible to service personnel. The separate bypass assembly increases cost, by adding parts and represents additional spare parts inventory, which typically must remain available for the sales life of the product, plus ten years.

The present invention addresses at least some of the disadvantages of the current arrangement of a quench valve with a parallel, manually operated, bypass valve. In particular, the present invention provides an arrangement in which a single valve provides the functions of both a quench valve and a bypass valve.

BRIEF DESCRIPTION OF THE DRAWINGS

The above, and further, objects, characteristics and advantages of the present invention will become more apparent with reference to the following description of certain embodiments thereof, with reference to the following figures.

DESCRIPTION OF THE PREFERRED EMBODIMENTS

Figure 1:
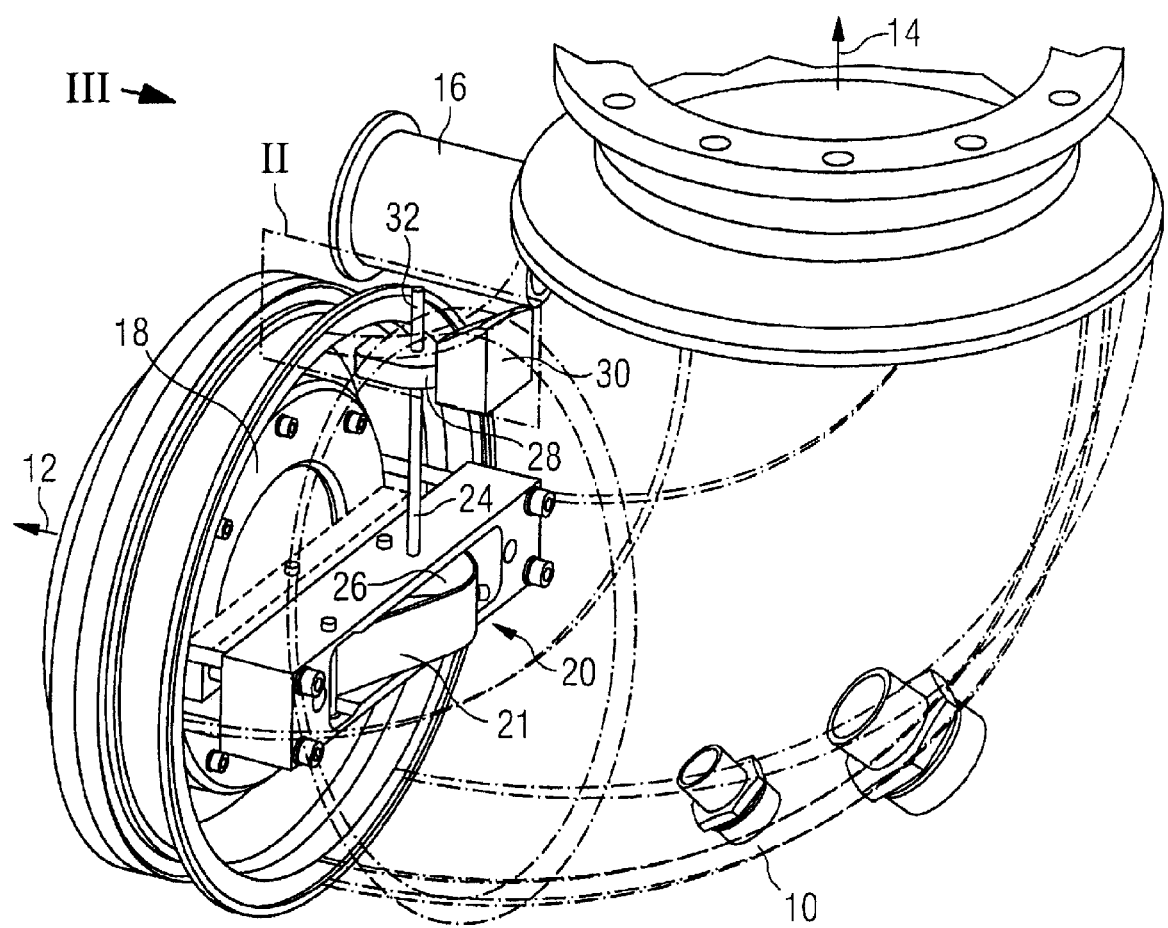
FIG. 1 shows a cut-away perspective view of a valve arrangement according to an embodiment of the present invention.

FIG. 1 shows a combined quench valve and bypass valve according to an embodiment of the invention. In the illustrated embodiment, the valve of the invention is built into an elbow piece 10 of a cryogen gas recuperation path. In use, the elbow piece 10 is connected to a cryogen vessel, in direction 12, and is connected to a cryogen gas recuperation arrangement in direction 14. Of course, the combined quench and bypass valve of the present invention need not be implemented within an elbow piece, but may be provided in a straight section of the cryogen gas recuperation path, or any other suitable housing.

In the illustrated embodiment, an auxiliary vent connection 16 is provided, for linking an auxiliary vent path from the cryogen vessel to the cryogen gas recuperation arrangement. Other arrangements may of course be provided within the scope of the invention.

A quench valve element 18 is connected to a quench valve mechanism 20, which retains the quench valve shut unless a pressure in excess of a predetermined safe limit is applied to the cryogen vessel side 12 of the quench valve element. Typically, the quench valve operates in response to the pressure differential between the high-pressure (cryogen vessel) side 12 and the low-pressure (recuperation facility) side 14. Preferably, the quench valve mechanism includes a constant torque spring 21 which holds the quench valve element 18 firmly against its seat 22 (FIG. 3) unless a pressure in excess of the predetermined safe limit is applied to the quench valve element, in which case the constant torque spring 21 will yield, allowing the quench valve to open and allow cryogen egress from the cryogen vessel towards the cryogen recuperation facility 14.

The features described above represent a conventional quench valve arrangement.

Figure 2:
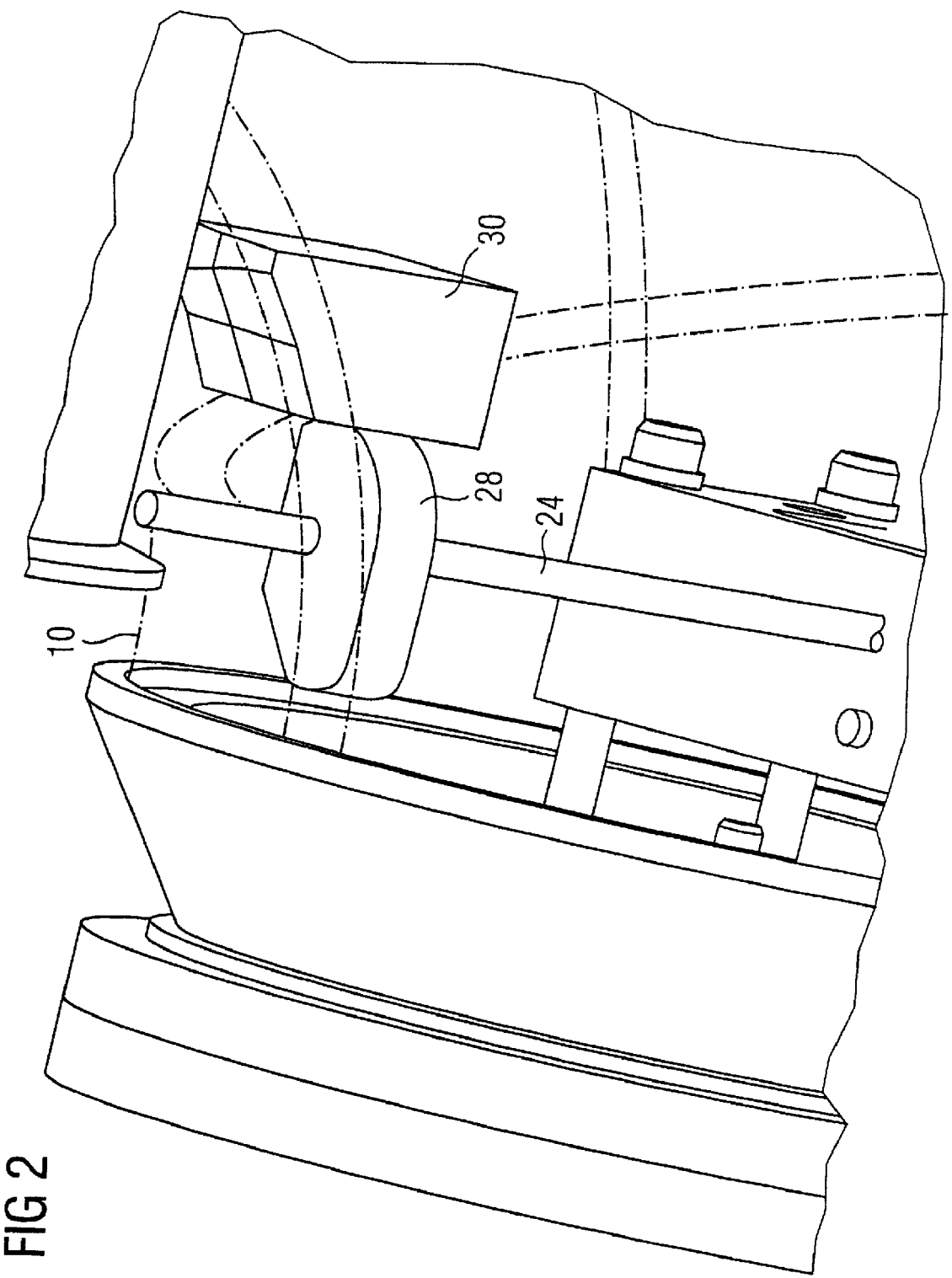
FIG. 2 shows an enlargement of the part of FIG. 1 designated II.

According to certain embodiments of the present invention, and as best illustrated in FIGS. 1 and 2, the burst disc mechanism 20 is provided with a manual operating facility, comprising a cam shaft 24 protruding through a wall of the elbow piece 10 and connected to a first cam 26 within the burst disc mechanism, and a second cam 28 which defines a range of operation of the cam shaft, and may provide a latching function. The second cam 28 bears against a cam follower 30 which is preferably formed on the interior of the wall of the elbow piece 10. In the illustrated embodiment, the cam follower is cast in the material of the elbow piece 10. While this represents a protrusion into the fluid flow path of the elbow piece, it is found that the majority of gas flow will pass near the outer curved wall of the elbow. By placing the cam follower 30 on the inner curved wall as shown, it interferes little with the flow of cryogen through the cryogen gas recuperation path. The cams 26, 28 and cam follower 30 may be arranged such that a flow of gas may be established through the valve at a predetermined mass flow rate. This may reduce flash losses of cryogen which might otherwise occur if the valve is opened unnecessarily widely.

The quench valve element 18 may comprise a burst disc. The quench valve mechanism operates by gas exerting a uniform pressure against the surface of the quench valve element. This in turn pushes a linkage which is connected to the cam 26, converting the linear force of the gas on the high pressure side 12 in to a rotational force on the cam 26. The cam is connected to a constant torque spring 21, which ensures that the cam rotates when a known linear force is applied, corresponding to a differential pressure of for example 41 kPa. As valve opens, pressure either side of the burst disc becomes equal as gas flows past it. When the pressure within the cryogen vessel reduces, the valve shuts under the influence of the spring 21. Should the valve element 18 fail to open, such as due to a mechanical failure of the mechanism, the pressure within the cryogen vessel may continue to increase. Should the pressure reach a higher value, for example 138 kPa, then the burst disc will rupture providing an egress path for gas through the valve element. This provides a fail safe pressure relief solution.

Figure 3:
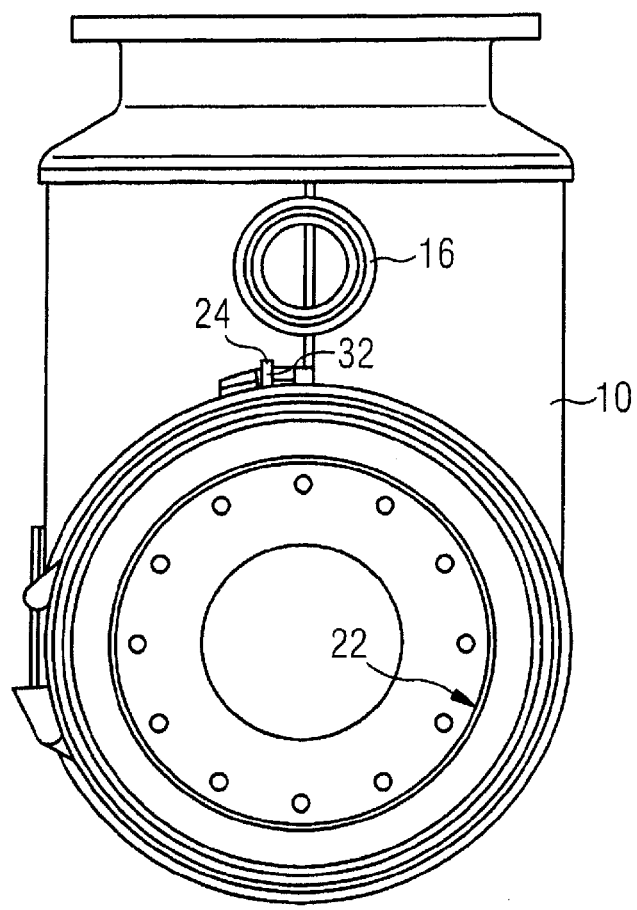
FIG. 3 shows a view of the embodiment of FIG. 1 along the direction designated III.

FIG. 3 shows a view of the embodiment of FIG. 1 seen in the direction of arrow III. As shown in FIG. 3, it may be found beneficial to arrange for the cam shaft 24 to pass through the wall of the elbow piece 10 rather off-centre, in this case to avoid interfering with the pipe work which will be connected to the auxiliary vent connection 16. The burst disc mechanism 20 and the cam shaft 24 may of course be arranged such that the cam shaft passes through the wall of the elbow piece in any convenient direction, suitable for access by a service technician.

Preferably, the cam shaft 24 terminates outside of the wall of the elbow piece with a splined end 32. An operating handle or wheel 33 is slid over the splines to enable manual opening and closing of the combined quench valve and bypass valve of the present invention, typically by a service technician. It is preferred that the operating handle or wheel 33 is detachable from the cam shaft, so that it cannot be tampered with by un-trained personnel. It may be preferred that the operating handle or wheel is retained by the service technician, rather than being left at the site of the cryogen vessel. A locking arrangement or a special spline arrangement may be used to reduce the temptation to tamper with the valve using makeshift operating tools such as spanners or pliers.

Figure 4:
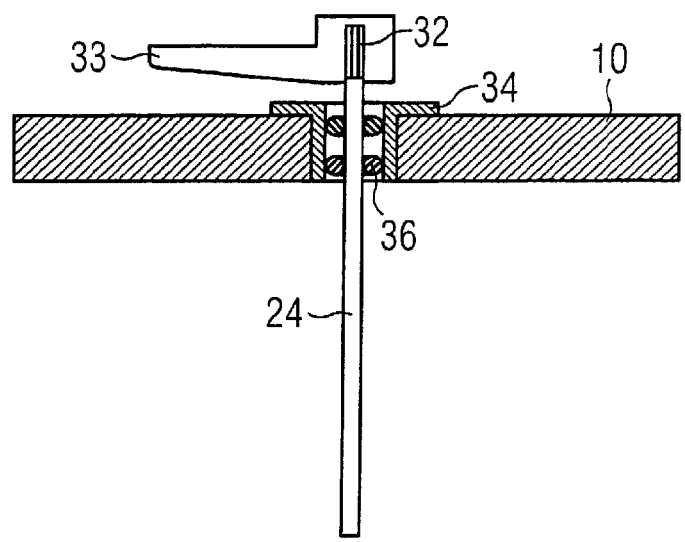
FIG. 4 shows a cross-section through a sealing arrangement used to allow a camshaft to pass through a wall, in accordance with a feature of an embodiment of the invention.

FIG. 4 schematically illustrates a possible arrangement for leading the cam shaft 24 through the wall of the elbow piece 10, while ensuring that the cryogen gas recuperation path remains sealed from atmosphere. As illustrated, a bush 34 is let into a hole in the wall of the elbow piece, and is secured to the wall, for example by adhesive. The cam shaft 24 passes through the bush, and so through the wall of the elbow piece 10. One or more o-rings 36 are provided, sealing between the bush and the cam shaft. Preferably, at least two o-rings 36 are used, to ensure continued sealing should one o-ring fail, and to distribute the pressure differential between the cryogen gas recuperation path and atmosphere across more than one seal.

The invention as described hereto provides a combined quench valve and bypass valve which allows manual intervention, to vent cryogen from a cryogen vessel, without the inconveniences of providing a separate bypass valve and bypass valve cryogen path.

The present invention may also be modified to advantageously be operated by a control system, enabling automatic or remote opening or closing of the combined quench valve and bypass valve.

According to this aspect of the present invention, a controlled actuator, such as one based on an electric motor, or a pneumatic or hydraulic actuator, is fitted to the quench valve operating mechanism. The actuator will receive control signals instructing the opening or closing of the valve. In a preferred arrangement, the control signals are provided by a magnet supervisory system, in the context of a nuclear magnetic resonance (NMR) or magnetic resonance imaging (MRI) superconducting magnet cooled in the cryogen vessel. The magnet supervisory system is a control system which controls operation of the magnet, and would be capable of issuing the correct commands at times when opening of the valve is desirable. The magnet supervisory system is typically linked to a host computer in the imaging suite, which is in overall control of the operation of the magnet, and can cause the magnet supervisory system to issue commands to the actuator to cause the valve to be opened or closed.

Figure 5:
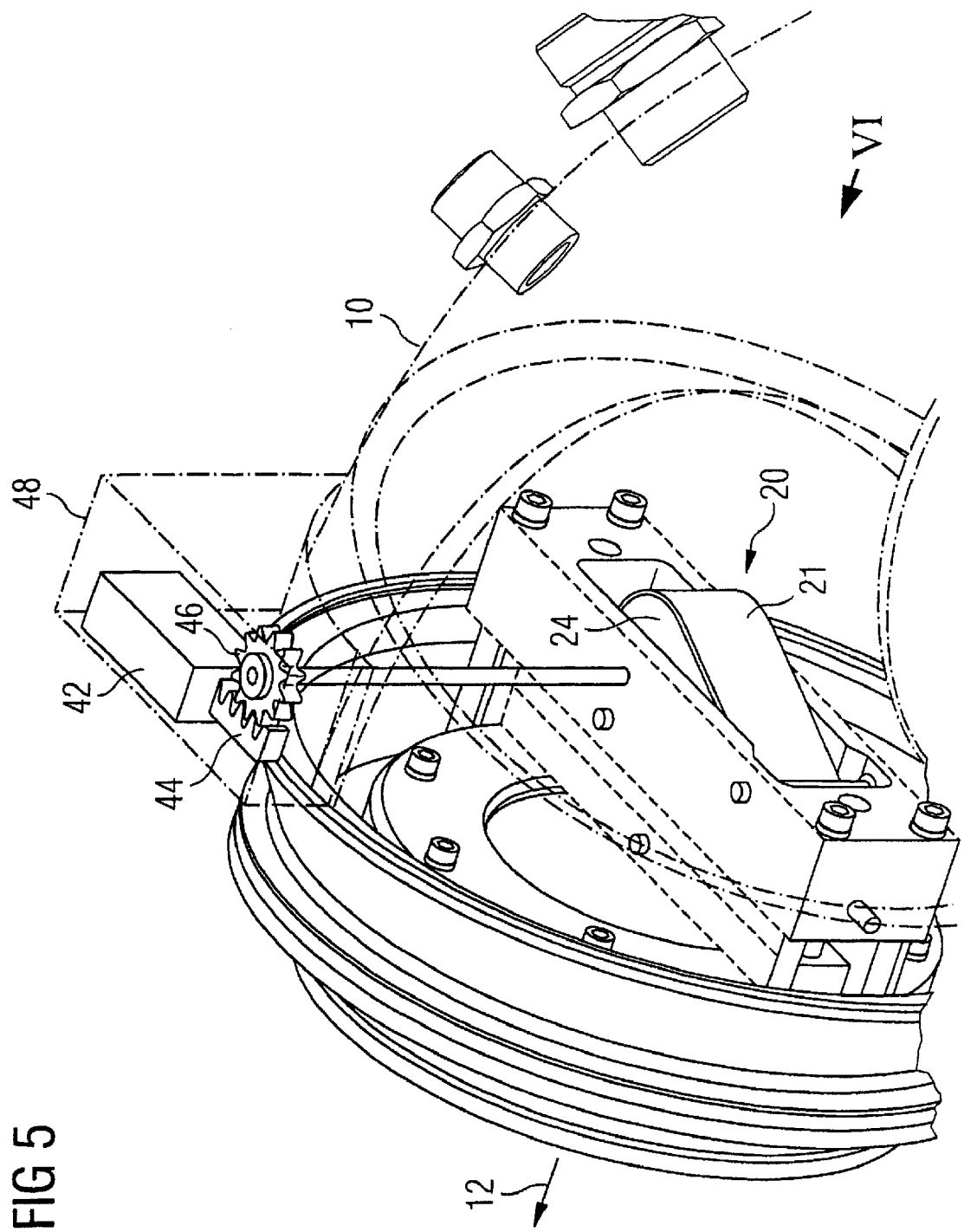
FIG. 5 shows a cut-away perspective view of a valve arrangement according to an embodiment of the present invention.

FIG. 5 shows an embodiment of the invention including a controlled actuator 40. Features common with features shown in earlier drawings carry corresponding reference numerals. In the illustrated embodiment, the actuator 40 includes an electrically operated motor 42, for example a stepper motor, arranged to drive a worm gear or rack 44 which engages a pinion gear wheel 46 which drives the cam shaft 24. Use of gears 44, 46 enables the relatively large force required to open the valve against the constant torque spring 21 to be generated by a relatively modestly sized motor 42. The second cam 28 and the associated cam follower 30 shown in the embodiment of FIG. 1 are not required in this arrangement, since the definition of the possible range of movement of the cam shaft, and position locking, may be achieved by the cam shaft 24, gears 44, 46, motor 42 and control arrangement by suitable arrangements which will be apparent to those skilled in the art. An actuator housing 48 is preferably provided around the actuator, including the end of the cam shaft 24 and the associated gears 44, 46 to protect the arrangement from interference or the ingress of debris. In some arrangements, the actuator housing may be sealed to the wall of the elbow piece 10, with the interior of the actuator housing 48 effectively forming part of the cryogen gas recuperation path. In alternative arrangements, a sealing arrangement may be provided around the cam shaft, similar to the arrangement shown in FIG. 4, and the actuator housing 48 may contain atmospheric air.

Figure 6:
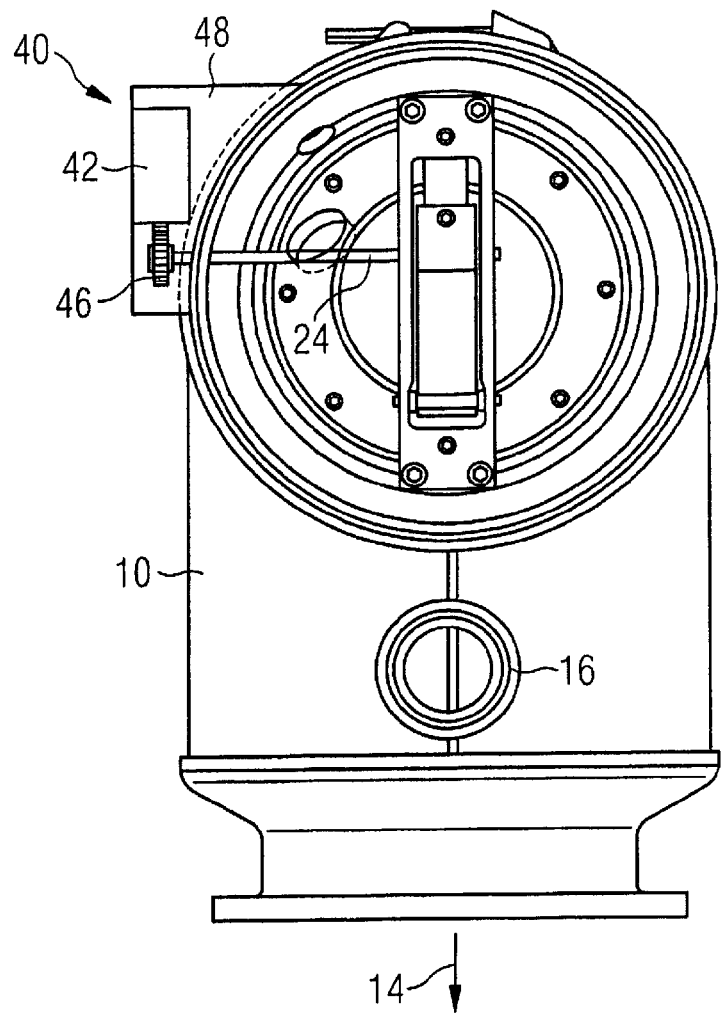
FIG. 6 shows a view of the embodiment of FIG. 5 along the direction marked VI.

FIG. 6 shows a view of the embodiment of FIG. 5, in the direction shown by arrow VI. As can be seen in FIG. 6, the cam shaft 24 may pass through the side of the elbow piece 10. There is more flexibility in the positioning of the cam shaft 24 in embodiments using a controlled actuator 40, since the requirement for service technician access is not as critical. It may, however, be preferred to provide a splined protrusion of the cam shaft 24, as in the embodiment of FIGS. 1-4 for manual activation in case of control system failure.

Figure 7:
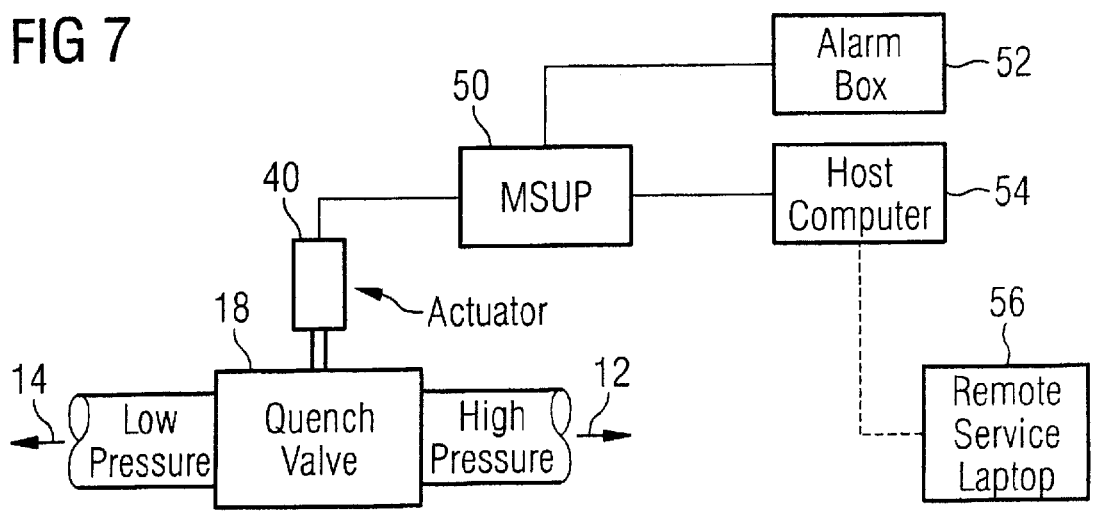
FIG. 7 schematically illustrates how the valve of FIGS. 5 and 6 may fit into an overall arrangement of an imaging system.

FIG. 7 schematically illustrates how the quench valve of FIGS. 5 and 6 may fit into an overall control arrangement for an imaging system such as a magnetic resonance imaging system. Schematically illustrated is quench valve element 18 located between relatively high-pressure access 12 to the cryogen vessel and relatively low-pressure access 14 to the cryogen gas recuperation facility. Actuator 40, described above, is mechanically linked to the quench valve element 18. Actuator 40 is connected to a controller. In this example the controller is the magnet supervisory system 50. The magnet supervisory system 50 is typically connected to receive data inputs from various sensors indicating the state of the magnet and physical conditions within the cryogen vessel. The magnet supervisory system may be arranged to react to data values above or below certain limits, or certain detected magnet states by opening or closing the valve element 18. An alarm box 52 may be connected to the magnet supervisory system 50, and preferably includes a display to inform a user whether the valve 18 is open, or is in its closed position against valve seat 22. Typically, the magnet supervisory system 50 is connected to a host computer 54 which is in overall control of maintenance and operation of the imaging system including the magnet and cryogen vessel. The host computer will instruct the magnet supervisory system 50 according to the required operation of the imaging system.

Optionally, and shown in phantom in FIG. 7, a remote service portable computer such as a laptop personal computer 56 may be connectable to the host computer, for example over the internet, by radio or by telephone line. Using the remote service portable computer 56, a service technician may send requests or commands to the host computer, which cause the valve 18 to be opened or closed.

One advantage of the controlled actuator 40 shown in FIGS. 5 and 6 is that it allows accurate intermediate valve openings to be reliably achieved. For example, the manually operated valve is usually either open or closed. It is not possible for a service technician to reliably and repeatedly open the valve to achieve, for example, a required gas flow rate or open cross-sectional area. By providing appropriate sensors and control algorithm, the controlled actuator 40 of the present invention may reliably and repeatedly achieve such accurate opening proportions.

By operating the valve with a controlled actuator, a control program may determine when the valve should be closed, which will prevent the valve from being accidentally left open due to human error, which is a risk for manually-operated valves. For example, the magnet supervisory system 50 may be programmed to check the position of the valve at regular intervals and to close the valve if no state is detected which would require the opening of the valve.

As the actuator 40 is controlled by the magnet supervisory system 50, a control method may be operated which uses the opening and closing of valve 18 by actuator 40 to maintain a certain pressure within the cryogen vessel. A particular advantage of such an arrangement would be in that it would prevent the pressure within the cryogen vessel from falling below atmospheric pressure. This is to be avoided, since air ingress to the cryogen vessel will result in air and water ice deposits forming within the cryogen vessel.

A spring return mechanism may be fitted, such that the valve element 18 is closed against its seat 22 in the case of a power failure, ensuring that the cryogen vessel is safe from air ingress.

If a service technician needs to work on a cooled magnet, or any other equipment within the cryogen vessel, it is typically necessary to reduce the pressure within the cryogen vessel to atmospheric pressure, to allow access to the cryogen vessel. In typical known service arrangements, a service technician arrives on site and opens a manual bypass valve to allow cryogen gas to escape into a recuperation facility, or to atmosphere. To achieve this depressurization in a controlled manner typically takes 30 minutes or more. While depressurization takes place, the service technician must wait, and cannot begin service operations. The cooled equipment is not usable, and the owner of the equipment may feel that valuable equipment time is being wasted. The service technician's time is typically billed hourly, and the user may resent paying for the waiting time. The service technician may be tempted to open the bypass valve sooner and more widely than necessary so that the cryogen vessel is depressurized more rapidly. This may result in increased loss of cryogen as liquid cryogen may be expelled. Increased thermal and mechanical shock may be experienced by parts of the equipment.

According to an embodiment of the present invention, and with reference to FIG. 7, a service technician may be provided with a remote service portable computer 56, with which the technician may send commands and requests to the host computer 54. The remote service portable computer 56 may be linked to the host computer 54 by the internet, over a telephone line, by radio link or any other suitable communications medium.

When a service operation is necessary, the service technician can contact the host computer remotely, and request opening of the valve 18 in time for the technician's arrival. Using stored control programs within the host computer and/or the magnet supervisory system 50, the valve 18 may be controlled by actuator 40 to gradually release pressure within the cryogen vessel according to a sequence which is found to minimize cryogen loss. Sensors conventionally provided within the cryogen vessel, or on the cryogen vessel side of valve 18 send cryogen gas pressure data to the magnet supervisory system 50, which uses this pressure data to ensure that the gas pressure within the cryogen vessel is not allowed to become sub atmospheric. For example, if the service technician expects to arrive on site at 11:00 am, the technician may request depressurization of the cryogen vessel by 11:00 am. The host computer and magnet supervisory system will decide when depressurization should begin, taking into account factors such as planned operation of the imaging system, atmospheric pressure and so on. If the imaging system is not in use, the host computer may decide to begin depressurization at about 10:00 am, and to proceed relatively slowly to as to reduce cryogen loss. Should depressurization proceed too rapidly, and the gas pressure reach atmospheric pressure at 10:45 am, the valve 18 may be sealed against its seat 22 to prevent air ingress. When the technician arrives at 11:00 am, the cryogen vessel is ready to be opened. This contrasts favorably with the conventional arrangement in which the cryogen vessel would not have been ready to be opened until about 11:30 am, 30 minutes after the technician begins to depressurize the cryogen vessel by manually opening a bypass valve. Should the technician be delayed, the valve 18 will be sealed, and the cryogen vessel gas pressure maintained above atmospheric until the technician arrives. In known methods, a technician arriving late on site may be tempted to depressurize the cryogen vessel more rapidly than usual, to try to make up lost time, but losing additional cryogen in the process.

This embodiment of the invention accordingly reduces system down-time, and reduces the time spent on site by the technician as well as minimizing the cryogen lost during depressurization.

Although modifications and changes may be suggested by those skilled in the art, it is the intention of the inventors to embody within the patent warranted hereon all changes and modifications as reasonably and properly come within the scope of their contribution to the art.

We claim as our invention:

1. A valve for controlling cryogen egress from a cryogen vessel, comprising:
    a valve housing having a low pressure side and a high pressure side with a fluid path between said low pressure side and said high pressure side;
    a valve element located in said fluid path in said housing between said low pressure side and said high pressure side;
    a mechanism in said housing that holds said valve element against a valve seat in said fluid path to close said fluid path, and that causes displacement of said valve element from said valve seat to open said fluid path in response to a differential pressure between said high pressure side and said low pressure side that exceeds a predetermined threshold;
    said mechanism also comprising a cam shaft that is rotatable to displace said valve element from said valve seat to open said fluid path independently of said differential pressure; and
    a first cam carried by and co-rotatable with said cam shaft that engages said valve element dependent on rotation of said cam shaft to move said valve element relative to said valve seat, and a second cam carried by and co-rotatable with said cam shaft, and a cam follower, said second cam being rotated by said cam shaft into contact with said cam follower and said second cam and said cam follower, in combination, defining an angular range of rotation of said cam shaft.

2. A valve as claimed in claim 1, wherein said valve housing has a housing wall, and wherein said cam shaft passes through said housing wall.

3. A valve as claimed in claim 2, wherein said cam shaft, outside of said valve housing, comprises a grippable element allowing manual rotation of said cam shaft.

4. A valve as claimed in claim 3, wherein said cam shaft has a splined end, and wherein said grippable element is removably engaged with said splined end.

5. A valve as claimed in claim 1, wherein said first and second cams and said cam follower, in combination, define a predetermined fluid flow, at a predetermined mass flow rate, through said fluid path.

6. A valve as claimed in claim 1 wherein said first and second cams and said cam follower, in combination, define a predetermined open cross-sectional area through said fluid path.

7. A valve for controlling cryogen egress from a cryogen vessel, comprising:
    a valve housing having a low pressure side and a high pressure side with a fluid path between said low pressure side and said high pressure side;
    a valve element located in said fluid path in said housing between said low pressure side and said high pressure side;
    a mechanism in said housing that holds said valve element against a valve seat in said fluid path to close said fluid path, and that causes displacement of said valve element from said valve seat to open said fluid path in response to a differential pressure between said high pressure side and said low pressure side that exceeds a predetermined threshold; and
    said mechanism also comprising a cam shaft that is rotatable to displace said valve element from said valve seat to open said fluid path independently of said differential pressure and an electronically controlled actuator mechanically linked to said cam shaft, said electronically controlled actuator being configured to rotate said cam shaft in response to control signals supplied to said electronically controlled actuator.

8. A valve as claimed in claim 7, wherein said electronically controlled actuator is configured to receive command signals generated by a magnet supervisory unit of a magnetic resonance imaging system.

9. A valve as claimed in claim 7, wherein said electronically controlled actuator is configured to receive command signals generated by a command signal generator operable by a service technician.

10. A valve as claimed in claim 7, wherein said electronically controlled actuator comprises an electric motor, and a gearing arrangement placing said electric motor in driving engagement with said cam shaft.

11. A magnetic resonance imaging system comprising:
    a cooled superconducting magnet;
    a cryogen vessel in which said superconducting magnet is contained; and
    a valve that controls cryogen egress from said cryogen vessel, said valve comprising a valve housing having a low pressure side and a high pressure side with a fluid path between said low pressure side and said high pressure side, a valve element located in said fluid path in said housing between said low pressure side and said high pressure side, a mechanism in said housing that holds said valve element against a valve seat in said fluid path to close said fluid path, and that causes displacement of said valve element from said valve seat to open said fluid path in response to a differential pressure between said high pressure side and said low pressure side that exceeds a predetermined threshold, and said mechanism also comprising a cam shaft that is rotatable to displace said valve element from said valve seat to open said fluid path independently of said differential pressure.

12. A magnetic resonance imaging system as claimed in claim 11, comprising an electronically controlled actuator mechanically linked to said cam shaft, said electronically controlled actuator being configured to rotate said cam shaft in response to control signals supplied to said electronically controlled actuator.

13. A magnetic resonance imaging system as claimed in claim 12 comprising a magnet supervisory system in communication with said electronically controlled actuator, that generates said control signals for said electronically controlled actuator.

14. A magnetic resonance imaging system as claimed in claim 13 comprising a host computer in communication with said magnet supervisory system, said host computer being configured to supply control commands to said magnet supervisory system.

15. A magnetic resonance imaging system as claimed in claim 13 comprising a remote service portable computer configured to communicate via a telecommunications path with said host computer, to supply remote commands to said host computer that said host computer, in turn supplies to said electronically controlled actuator.

* * * * *